Patented Feb. 22, 1949

2,462,103

UNITED STATES PATENT OFFICE 2,462,103

PREPARATION OF ALPHA-KETO-DIHYDRONAPHTHALENE

Robert Johnson, Verona, Pa., assignor to Koppers Company, Inc., Pittsburgh, Pa., a corporation of Delaware No Drawing. Application March 23, 1946, Serial No. 656,782

11 Claims. (Cl. 260—590)

The present invention relates to an improved process for the preparation of oxidation products of tetrahydronaphthalene, or tetralin, and has particular reference to the preparation of alpha keto tetrahydronaphthalene, termed, briefly, alpha tetralone.

Tetralin oxidizes upon being brought into contact with air or oxygen at elevated temperatures and in the presence of certain catalysts. Alpha tetralone is produced by such oxidation in admixture with a certain quantity of the alcohol derivative, alpha tetralol. The yield of the ketone is reduced by the formation of the alcohol as they are both produced by decomposition of the primary oxidation product of tetralin, tetralin peroxide, according, it is believed, to the following formulae. The reduction in the formation of one enhances the yield of the other.

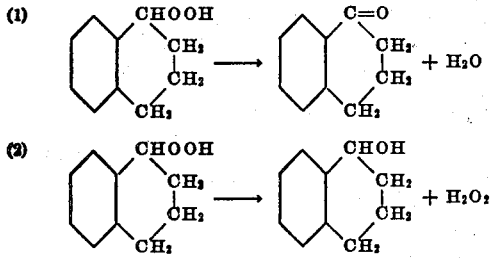

It has been proposed to employ certain specific catalysts in the oxidation of tetralin so that a predominant proportion of the reaction product would comprise an admixture of alpha tetralol and alpha tetralone. Nevertheless the yield of the ketone was always found to be reduced by the presence of other oxidation products and such attempted non-aqueous decomposition of the oxidation product results largely in the formation of unwanted by-products.

It is an object of the present invention to obtain increased yields of alpha tetralone from the oxidation products of tetralin.

It is a further object of the invention to so control the primary oxidation of tetralin that the reaction product of this oxidation may be simply treated to convert it substantially completely to alpha tetralone.

The invention has for further objects such other improvements and such other operative advantages or results as may be found to obtain in the processes hereinafter described or claimed.

Briefly stated, the present invention comprises controllably oxidizing tetralin with air or oxygen in the presence or absence of catalyst in such manner as to form a maximum proportion of the primary oxidation product, tetralin peroxide, and in a separate step decomposing catalytically the formed tetralin peroxide with an aqueous solution of a copper salt of a mineral acid stable in solution under operating conditions whereby alpha tetralone in improved yields is obtained. The presence of the water, in which these soluble catalysts are dissolved, is of importance to the effective decomposition of the peroxide to form the alpha tetralone, as known non-aqueous decompositions of tetralin oxidation products result, as aforesaid, in the unwanted by-products. The so-produced alpha tetralone is associated with only a minor proportion of alpha tetralol which can be decomposed by distillation of the mixture under pressure or it may be converted to 1,2-dihydronaphthalene by vapor phase dehydration of the tetralol contained in the oxidation products over an alumina-bearing catalyst. Yields of approximately 90% of alpha tetralone are thereby obtained.

Tetralin peroxide was prepared in one instance by oxidation of tetralin with oxygen at 90° C. in the presence of 0.33% of copper carbonate. The solution of tetralin peroxide that was prepared in such a manner was thereafter separated into several portions which were variously treated with aqueous solutions of copper salts of mineral acids at the temperatures of 25° C., 60 to 65° C., and 100° C. The rate of decomposition of the peroxide was determined by analysis of the tetralin solution for the remaining peroxides every one-half hour. When the peroxide decomposition was substantially completed, acidic oxidation products were removed by extraction with an alkali hydroxide and the unreacted neutral material was distilled to effect a separation into tetralin, tetralol and tetralone, and neutral by-product residue. The ratio of ketone to alcohol in the alpha tetralone-tetralol fraction was determined by carbonyl and hydroxyl analysis.

An important phase of the process for preparation of improved yields of alpha tetralone from tetralin is the preservation of tetralin peroxide as the major oxidation product. Oxygen or the oxygen content of air can be used in the oxidation of tetralin. The tetralin is oxidized in liquid phase at atmospheric or superatmospheric pressures. Preferably a catalyst, such as the above mentioned cupric carbonate, is employed in suspension in the tetralin so that higher conversions to the peroxide can be obtained without excessive loss of tetralin to more completely oxidized products. The reaction is exothermic and requires a removal of heat from the reaction zone by, for example, cold water contained in a surrounding water jacket so that the temperature of reaction will not exceed a temperature of about 90° C. The oxidation catalyst can be permitted to settle from the oxidation product or preferably it can be filtered therefrom.

The tetralin and oxidation products are thereafter mixed with an aqueous solution of between 10% to 30% by weight of a copper sulfate or chloride at a temperature between 25° and 100° C., and preferably at a temperature range between 60° and 90° C. The selected water-soluble copper salt must be stable in solution at the operating temperatures above given. After thorough mixing of the reactants the aqueous solution is permitted to settle. The solution of copper salt of mineral acid is withdrawn by decantation from a supernatant layer containing the unreacted tetralin and formed alpha tetralol and alpha tetralone. The supernatant layer is thereafter fractionally distilled in a vacuum whereby the alpha tetralone-alpha tetralol fraction is separated from unreacted tetralin and a minor proportion of other oxidation products. Before distillation is performed any acidic oxidation products in the supernatant layer can be removed by a mild alkaline wash. If the distillation is performed under pressure, the minor amount of alpha tetralol is dehydrated by the heat of distillation to 1,2 - dihydronaphthalene and the alpha tetralone is consequently readily separable into a substantially pure fraction. Alternatively, the separated fraction of alpha tetralone and alpha tetralol can be vaporized and passed over an alumina-bearing catalyst as disclosed and claimed in inventor's copending application Serial No. 656,783 which was filed March 23, 1946, and which issued as Patent No. 2,436,864 on March 2, 1948, whereby the alpha tetralol will be dehydrated and converted to the readily separable dihydronaphthalene.

The tetralin which is recovered by the fractional distillation step can be returned to the oxidation zone for further production of tetralin peroxide. It can also be separated from the formed tetralin peroxide before decomposition of the latter by extraction at low temperature of the peroxide from the unreacted tetralin with mild alkaline aqueous solutions. The alkaline extract is thereafter neutralized with, for example, carbon dioxide before decomposition is performed.

An important requirement in order to obtain high yields of alpha tetralone is the selection of a catalyst. Tests with different catalysts has proved that the catalysts are quite individual in their effectiveness to produce a desired ratio of ketone to alcohol in the tetralin-peroxide decomposition product. The water-soluble copper salts of sulphuric and hydrochloric acid are of outstanding utility in the preparation of a decomposition product containing largely alpha tetralone. The catalysts are employed in aqueous solutions and have been found to have optimum effective concentrations for effecting the desired decomposition. The relative volume of aqueous catalyst solution employed is also of importance for it is a measure of the amount of dispersion of the catalyst obtainable and it has also been observed that the use of large volumes of solution also seems to aid in the decomposition reaction.

*Example 1*

600 ml. of a solution of tetralin peroxide in tetralin was treated at a temperature of 60° to 65° C. for one-half hour with a 30% aqueous solution of cupric chloride (250 ml.). A yield of 87.2% of alpha tetralol and tetralone, based on the weight of oxidized tetralin treated, was obtained. 93.4% of this fraction comprised alpha tetralone.

*Example 2*

Tetralin was oxidized by treatment with air in the manner hereinbefore described and 600 ml. of the oxidized product containing approximately 25% tetralin peroxide was added to 250 ml. of 10% aqueous solution of cupric sulfate. The solutions were stirred during addition and they were cooled during this period to remove the heat of reaction and maintain the mixture at about 85° C. Stirring was continued at the said temperature for ½ to 1 hour. The mixture was allowed to settle and separate. The separated tetralin solution was treated with $NaHCO_3$ to remove acids. The solution was then distilled under vacuum and fractionated into the following cuts:

| | Parts by weight |
|---|---|
| Tetralin | 412 |
| Tetralone and tetralol | 143 |
| Residue | 14 |

89.8% of alpha tetralol and tetralone, based on the weight of oxidized tetralin treated, was obtained. 91% of the tetralone tetralol fraction was alpha tetralone, and 8.2% was alpha tetralol. As aforementioned, the alpha tetralol can be dehydrated catalytically to dihydronaphthalene or can be dehydrated by simple distillation under pressure, and substantially pure alpha tetralone be thereby readily distillable therefrom.

*Example 3*

In another example of operation in which another sample of oxidized tetralin identical to that used in Example 2 was treated in an identical manner except that the aqueous solution of catalyst was in this instance, 10% Cu $Cl_2$, the distillation provided the following fractions:

| | Parts by weight |
|---|---|
| Tetralin | 384 |
| Tetralone and tetralol | 116 |
| Residue | 20 |

The yield of alpha tetralone-tetralol fraction was 84.7% by weight of the oxidized tetralin. The tetralone-tetralol fraction contained 92% alpha tetralone and 7.5% alpha tetralol.

Although published data would indicate that decomposition of the tetralin oxidation product with aqueous caustic solution will yield solely alpha tetralone this was found not to be the case and rather that as much as about fifty percent of tetralol is to be found in the reaction product. In the efficient production of alpha tetralone, therefore the decomposition step of invention exclusively provides a mixture comprising over 90% alpha tetralone.

The invention as hereinabove set forth is embodied in particular form and manner but may be variously embodied within the scope of the claims hereinafter made.

I claim:

1. A process for the synthesis of alpha tetralone from tetralin, the steps comprising: oxidizing tetralin in liquid phase with ozygen containing gas to a controlled degree whereby the oxidation product includes a major proportion of tetralin peroxide; decomposing the oxidation product by addition thereto of aqueous solution of a copper salt of a mineral acid; settling the mixture and decanting therefrom decomposition product comprising tetralin and alpha tetralone; separating the alpha tetralone from the tetralin by fractional distillation; and converting alpha tetralol present in the alpha tetralone to dihydronaphthalene and separating substantially pure alpha tetralone therefrom by fractional distillation.

2. In the synthesis of alpha tetralone by the controlled oxidation of tetralin; the steps of decomposing tetralin-oxidation product with an aqueous solution of a copper salt of a mineral acid and converting alpha tetralol present in the so-formed alpha tetralone to dihydronaphthalene and separating substantially pure alpha tetralone therefrom by fractional distillation.

3. The process as claimed in claim 1 wherein the copper salt is copper sulphate.

4. The process as claimed in claim 1 wherein the copper salt is copper chloride.

5. A process for the synthesis of alpha tetralone from tetralin comprising: catalytically oxidizing tetralin with an oxygen-containing gas in the presence of a copper carbonate catalyst and at a temperature of about 90° C. to produce tetralin peroxide, decomposing the tetralin peroxide in the presence of an aqueous solution of a copper salt of a mineral acid to produce a mixture of alpha tetralol and alpha tetralone, catalytically dehydrating the alpha tetralol to 1,2-dihydronaphthalene and separating alpha tetralone from the 1,2-dihydronaphthalene by distillation.

6. A process for the synthesis of alpha tetralone from tetraline comprising: catalytically oxidizing tetralin with an oxygen-containing gas to produce tetralin peroxide, decomposing the tetralin peroxide in the presence of an aqueous solution of a copper salt of a mineral acid to produce a mixture of alpha tetralol and alpha tetralone, dehydrating the alpha tetralol by passing it in vapor form in contact with an alumina bearing catalyst to convert the alpha tetralol to 1,2-dihydronaphthalene and separating the 1,2-dihydronaphthalene from the alpha tetralone by fractional distillation.

7. A process for the synthesis of alpha tetralone from tetralin comprising: catalytically oxidizing tetralin with an oxygen-containing gas to produce tetralin peroxide, decomposing the tetralin peroxide in the presence of an aqueous solution of a copper salt of a mineral acid to produce a mixture of alpha tetralol and alpha tetralone, distilling the mixture of alpha tetralol and alpha tetralone under pressure to dehydrate the alpha tetralol to 1,2-dihydronaphthalene and separating the alpha tetralone from 1,2-dihydronaphthalene by fractional distillation.

8. The process as claimed in claim 5 wherein the copper salt is copper sulfate.

9. The process as claimed in claim 5 wherein the copper salt is copper chloride.

10. The process as claimed in claim 7 wherein the copper salt is copper sulfate.

11. The process as claimed in claim 7 wherein the copper salt is copper chloride.

ROBERT JOHNSON.

REFERENCES CITED

The following references are of record in the file of this patent:

UNITED STATES PATENTS

| Number | Name | Date |
| --- | --- | --- |
| 1,789,924 | Binapfl | Jan. 20, 1931 |

OTHER REFERENCES

Nussle, American Journal Pharmacy 107, pages 29–32 (1935).